United States Patent Office 3,228,777
Patented Jan. 11, 1966

3,228,777
SINGLE APPLICATION LINSEED OIL-IN-WATER EMULSIONS FOR CURING AND/OR PREVENTING SPALLING OF CONCRETE
William L. Kubie, Sr., Peoria, Ill., assignor to the United States of America as represented by the Secretary of Agriculture
No Drawing. Filed Mar. 25, 1963, Ser. No. 267,865
1 Claim. (Cl. 106—12)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to non-toxic water-dispersible dual purpose curing and anti-spalling compositions that within a few hours after application to the surface of even soaking-wet, freshly poured concrete or Portland cement very rapidly crosslink and dry, thereby forming continuous films or membranes that tenaciously bond to the uncured cement or concrete surface whether outdoors as of highways, streets, sidewalks, driveways, or parking lots or indoors as in the case of the concrete floors of manufacturing plants, garages, plane hangars, etc., thus preventing the rapid loss of internal water, the greatly retarded evaporation of which and consequently prolonged presence is well known to be required for internal hydration and the gradual development of structural strength. My novel film-forming emulsions contain a novel emulsion-stabilizing agent, namely dipicolinic acid or alkali salt thereof. The water-barrier membranes which form by air oxidation after simply spraying my herein disclosed oil-in-water emulsions on the surface of the fresh concrete become so firmly bonded to the concrete surface and are so resistant to traffic wear that they remain intact long after the curing period and then serve to prevent the absorption of water by the concrete, and thereby prevent spalling of the water-containing concrete surface when the concrete is subjected to winter freeze-thaw cycles.

More particularly, this invention relates to novel linseed oil compositions, spray emulsion applications of which to the surface of freshly poured, uncured concrete floorings, roads, and related structures rapidly forms a unique dual purpose film that within about an hour forms a film or functional equivalent that first provides the water retention that is essential for the slow curing that gives structural strength to concrete and then continues to maintain its film integrity almost indefinitely beyond the month or more that is required for curing to prevent water absorption and thereby provide an effective anti-spalling action that protects the surface of the cement or concrete.

It is well known that, for the development of maximum load-bearing strength, freshly poured Portland cement and concrete must be very gradually cured through a prolonged internal hydration mechanism that requires the presence of internally available water, over a period of from at least weeks to several months after being poured. It is also known that the highest rate of water loss from an unprotected surface occurs in the first few hours after pouring and that almost immediate rewetting and provision of at least some kind of an evaporation barrier are critical for proper curing that is essential for developing structural strength in the concrete. Thus, the desirability of earliest practicable application of a quick drying, film-forming, evaporation-retarding composition to keep freshly poured concrete and cement in the initially very hydrated state required for a proper cure and the avoidance of low compressive strength and a high susceptibility to internal fatigue that causes premature cracking or other failure from the inability of the concrete to withstand indefinitely the repetitive stresses imposed by heavy trucks and high speed traffic or by massive machines such as those used in foundries, roller mills, and other heavy industry plants, is well known in the art.

Although some road builders and allied contractors still prefer to cure concrete by laboriously covering the freshly poured concrete with a wettable material such as straw or earth that is, in turn, covered with burlap, canvas, etc., that permits re-wetting and thus delays the rapid loss of water through the upper surface of the poured concrete, most prefer to spray film-forming compositions that have been known and commercially available for nearly forty years as exemplified by the "Hunt Process" products which comprise the registered mark for membrane-forming concrete-curing agents manufactured by the Carter-Waters Corporation of Kansas City, Missouri. According to Carter-Waters' trade publication on their "Hunt Process" products, one of their sprayable formulations is a "blend of oils, resins, and waxes in a petroleum solvent," while their "black" formulation comprises asphalts and pigment thinned with a petroleum solvent. It is apparent that the presence of flammable petroleum solvents in the above products exposes the workmen to the dangerous effects of contact absorption and, particularly when spraying in an enclosed area such as in a building, to inhalation of the volatile fumes of the evaporating naphtha or similar solvent. In addition, the presence of waxes particularly in the prior art unpigmented product that would be employed for curing a newly poured highway, would prevent the immediate painting of traffic lanes, etc., until after the wax had been worn off by traffic or has been sand blasted, as shown by Blubaugh, U.S. Patent No. 3,075,854.

U.S. Patent No. 2,839,811 of Benedict et al., teaches a concrete-curing high solids composition comprising crystalline wax, microcrystalline wax, and cyclized natural rubber partially solvated and dispersed in a hydrocarbon solvent which composition is thinned for use by the addition of additional solvent. Obviously, the solvent is hazardous in the same ways mentioned in the preceding paragraph, and traffic paint (for marking lanes) would not be durable if promptly applied.

Tillman, U.S. Patent No. 2,963,765, teaches sprayable film-forming compositions for the curing of concrete, which compositions comprise mainly a microstalline wax whose dispersion is about 4 parts by weight of naphtha or similarly volatile organic solvent is assisted by a higher fatty amine that obviously acts with the water at the surface of the concrete to provide a surface tension-lowering effect that permits a more uniform deposition of the wax constituents.

It is apparent that all of the above described prior art curing agents have the disadvantages and hazards inherent in the use of a flammable solvent, the fire hazard being increased to the extent that tanker-type "gasoline" trucks would have to be employed to transport the large amounts of curing composition that might be required for the presently enlarged public roads construction program. Secondly, the presence of waxes in the prior art formulation necessitates waiting for the film to wear off under traffic conditions before one can obtain durable results from traffic paint. Thirdly, films of the prior art curing compositions do not exhibit prolonged durability particularly when subjected to very heavy traffic inasmuch as they are intended to provide only the relatively temporary membrane effect required of a concrete curing agent. Thus, the presently available curing compositions do not also provide an anti-spalling action since their films do not have in combination the required properties of extended durability, elasticity, flexibility, alkali-resistance, penetration of every minute irregularity of the concrete surface so as to provide a perfectly continuous film, and high resistance to the underlying physical distortions of the concrete during repeated freeze-thaw cycles as well as a related ability to withstand temperature-induced contractions and expansions.

Under sponsorship of the National Flaxseed Processors Association, there are several brands of a commercially available anti-spalling composition consisting of a 50 percent by volume solution of linseed oil in mineral spirits. The above composition is spray-applied to cured concrete but only in dry weather and to an absolutely dry surface. However, the mineral spirits vehicle (naphtha) does not provide a surfactant-assisted type of bonding at the interface between the linseed oil and the concrete, and the mineral spirits here again constitute a distinct health and fire hazard. Also a sudden shower before the solvent has fully evaporated and the linseed film has dried would ruin the continuity of the film.

Although, as already stated, the prior art concrete curing agents apparently are operative when employed for that purpose, they are incapable of surviving long enough to also act as effective anti-spalling agents. On the other hand, since the prior art anti-spalling agents cannot be applied to wet concrete, they cannot possibly also serve as curing agents for the necessarily wet cement and concrete. Thus, there are at present no dual-performance products that can first be employed as a curing composition or agent for cement and concrete and then after the curing function is completed can provide an anti-spalling action. Although cured concrete can be fairly well protected against spalling by the application of only one prior art composition (although it is necessary that the anti-spalling spray be applied only if the concrete is fully cured, specially cleaned, and has not been exposed to rain for at least 48 hours to assure that it is absolutely dry) the converse is not true. Thus, prior to applicant's invention, to cure concrete and also protect it from spalling required the separate application of two different compositions, thereby doubling the labor and equipment costs. If desired, the novel compositions of my invention can be competitively applied to old cement or concrete where only the anti-spalling action is sought without the prior art necessity of absolutely dry conditions.

A principal object of the present invention is the discovery of nontoxic and non-flammable dual purpose concrete curing and anti-spalling compositions that when sprayed on freshly poured concrete very rapidly form water-resistant films or membranes that have a durability that far exceeds the few weeks required for properly and fully curing the concrete and also appear to provide superior compression strengths as well as a virtually permanent resistance of the concrete to internal fatigue, and then for prolonged periods also protects the cement or concrete from "spalling" by continuing to provide an integrity of the film that prevents surface absorption and entry of water that under winter freeze-thaw cycles leads to spalling (localized crumbling of the concrete accompanied by the ejection of superficially located pebbles or small stones). My novel compositions can be employed to improve a partial but incomplete curing and yet if only the anti-spalling action is desired, can be very inexpensively employed on even old concrete or cement.

Another object is a stable linseed oil-based emulsifiable concentrate or readily constituted stable aqueous oil-in-water emulsion comprising linseed oil as the film-forming component which can be sprayed or painted on cured cement and concrete to provide a long lasting anti-spalling action by forming a continuous film that prevents the entry of water around partially exposed or very superficially cemented pebbles and stones present in the original mix.

Another object is the preparation of a water dispersible linseed oil concentrate that can be shipped without paying freight on a high water content, and at the site where it is to be applied, can be easily converted to an oil-in-water emulsion that remains stable for at least the several days that might be desirable to permit total use of any one batch, but which emulsions are not so stable that films formed therefrom will spontaneously emulsify in the presence of rain.

Another object is the preparation of linseed oil based compositions having the aforesaid dual capabilities that make the said compositions useful when applied to either fresh or old cement or concrete and that do not require absolute dryness or even relative dryness of the material to be treated.

Still another object is the development of curing and anti-spalling compositions which contain no waxes that would have to be removed or worn off prior to the application of traffic paint, the well-known difficulties of which with present curing or anti-spalling compositions are indicated by Blubaugh, U.S. Patent No. 3,075,854.

Still another object is the preparation of a stable linseed oil-in-water emulsion employing a "fugitive" emulsifier that very quickly crosslinks in air to become a permanently insoluble part of the film, thereby greatly contributing to the durability and effectiveness of the film.

A still further object is the preparation of dual purpose curing and anti-spalling emulsion concentrates or corresponding aqueous linseed emulsions that are applied as only a single coating and that are less costly per gallon and per square yard to be treated than is the case with the two operations involved in the use of the separately applied prior art single purpose compositions, each of which comprises about two-thirds by weight of relatively expensive and unrecoverable organic solvents.

Still another object comprises products having the aforesaid dual utilities but which do not contain volatile and potentially toxic organic solvents that would hamper or prohibit the employment of the composition especially in enclosed structures such as factories, mills, plane hangars, basements, etc.

Yet another object is a sprayable coating composition which can be cleaned from spray guns, etc., simply with soapy water and that does not require the use of unrecoverable organic solvents.

Another object is a dual purpose coating for cement and concrete that does not contain waxes which waxes delay the effective application of traffic paint.

Other objects and advantages of my invention will become apparent to one skilled in the art upon a further reading of the specific examples and the claim.

In accordance with the above and related objects of my invention I have now prepared dual purpose concentrated non-aqueous highly-stable water-emulsifiable linseed oil solutions whose deliberately relatively less stable oil-in-water ready for use emulsions are formed therefrom by merely diluting with at least an equal volume of water to provide compositions that may be sprayed or otherwise applied to the surface of freshly laid Portland cement or concrete to quickly form a membraneous coating or film that greatly retards the loss of the water, the presence of which is indispensible for proper curing, and which film or membrane then without additional treatment durably withstands the stresses imposed by traffic or other use so that it remains intact or so very nearly intact that it now effectively acts as a durable anti-spalling agent, apparently by preventing or greatly minimizing the absorption by the concrete of water or melted snow and ice that otherwise during winter and early spring would be repeatedly subjected in situ to destructive freeze-thaw cycles that cause extensive pitting of the concrete and sometimes cause fairly deep cracks that, once started, usually progressively enlarge, thus causing premature failure of the concrete especially under heavy traffic. My hereinafter described compositions may also be applied to the surface of cured cement or concrete or even to already spalled and pitted surfaces respectively to prevent the onset of spalling or its extension. Furthermore, my compositions are thoroughly compatible with water and, accordingly, do not require the absolutely dry and specially cleaned surfaces that are known to be required for the presently available naphtha-dissolved linseed oil anti-spalling compositions. Also my compositions contain no potentially toxic organic solvents and may be applied without special protective equipment by anyone even indoors as in a private garage or the basement of a home. Still further, my non-aqueous but easily water-emulsifiable concentrates may be cheaply transported without paying freight on water, and the water then added at or near the site of intended use, a relatively stable ready for use macro-emulsion then being obtainable by simple mixing in a tank, drum, or any convenient vessel. Finally, my linseed oil-in-water emulsions can be cleaned from the spraying equipment with soapy water and do not require the wasting of organic solvents.

The specific examples are presented to illustrate the preparation of my novel dual purpose concentrates and sprayable oil-in-water emulsions made therewith.

One aspect of my invention relates to stable very concentrated non-aqueous "solutions" of boiled linseed oil which readily form sprayable oil-in-water emulsions upon mixing therein about 1 to 1.5 parts by volume of water. Examples 1–3 illustrate such compositions which avoid the shipping of water, while Examples 4–6 set forth allied directly sprayable water-containing emulsions, which are stable to layering for only a few days, after which they would need to be briefly stirred, the lowered stability being intended to prevent partial re-emulsification of a freshly applied and incompletely crosslinked film in the event of a sudden rain.

EXAMPLE 1

95.5 gms. of commercially obtained "boiled" linseed oil and 2.5 gms. of commercially available (solid) tallow alcohol were warmed to form solution "A." In another vessel were mixed 0.7 gm. "Pentoxol" (i.e., 4-methoxy-4-methyl pentanol-2), 0.8 ml. of 28 percent ammonia solution, and 0.5 ml. of an 0.4 percent dispersion of dipicolinic acid in ethylene glycol that coacts with the "Pentoxol" as a solubilizing or coupling agent, thus forming solution "B." Solutions A and B were mixed to form a stable solution that formed a sprayable oil-in-water emulsion simply by stirring therein 1.0–1.5 volumes of ordinary tap water.

It will be understood that the formation of the non-aqueous but water-emulsifiable solution depends on my discovery that the expected precipitation of the oil-insoluble soaps formed in situ by reaction of the 1 percent or more of free acids present in the linseed oil with an alkali, e.g., sodium hydroxide, or potassium hydroxide is unexpectedly completely prevented by the solubilizing presence of a co-acting combination consisting of 2 parts of 4-methoxy-4-methyl-pentanol-2 and 1 part of ethylene glycol.

EXAMPLE 2

A stable non-aqueous solution and subsequently water-dispersed linseed oil-in-water emulsion equivalent to those of Example 1 were obtained by substituting 0.4 gm. sodium hydroxide for the ammonium hydroxide of Example 1.

EXAMPLE 3

Same as Example 1 excepting that 0.4 gm. potassium hydroxide was substituted for the ammonium hydroxide.

EXAMPLE 4

A product similar to Example 1 was prepared by first forming a solution consisting of 96 gms. of boiled linseed oil and 3 gms. tallow alcohol, to which solution was then added 0.01 gm. dipicolinic acid dispersed in 1 gm. of 2-amino-2-methyl-1-propanol. An equal volume of water was added and simple stirring gave a sprayable oil-in-water macro-emulsion that was applied to wet concrete as a rapidly film-forming curing agent. The substitution of the 2-amino-2-methyl-1-propanol by the mono-, di-, or tri-ethanol amines made the latter emulsions practically inoperative as curing agents because the last named amines so greatly delayed the required drying of the films that there was an extensive loss of water (highest gradient) during the highly critical early portion of the curing period.

In this example wherein the addition of the water to the stable linseed oil-fatty alcohol-dipicolinate soap solution can be deferred indefinitely, the small amount of dipicolinic acid is first solubilized in the form of its amino-alcohol soap.

EXAMPLE 5

A water-dispersible solution was prepared by dissolving 3 gms. of tallow alcohols in 97 gms. boiled linseed oil. Upon high speed mixing with an equal volume of water it formed an oil-in-water emulsion that was stable for about 12 hours. The excellent curing effect obtained on freshly made cement blocks suggests that a highly uniform film was formed and this may have been the result in part of an in situ formation of an insoluble soap by reaction of the sprayed material with alkaline components of the wet cement.

EXAMPLE 6

*(Direct preparation of "Ready for Use" linseed oil-in-water emulsion)*

48.5 parts by weight of boiled linseed oil and 1.5 parts of tallow alcohol were dissolved at 140° F. In another vessel were dissolved in 49.57 parts of water, 0.4 part of sodium hydroxide, and 0.03 part of dipicolinic acid. The two solutions were mixed to form a fairly stable oil-in-water emulsion that was applied as a terminal curing agent and an anti-spalling agent to a recently completed parking area, untreated control areas being left adjacent thereto. Although it is too early to see clear cut differences on the said parking lot, accelerated tests with this and other formulations conducted under contract by a land grant college having evaluation equipment and "know-how" are most encouraging. Other alkalies such as ammonium or potassium hydroxides that would form water-soluble soaps with the free acids of the linseed oil and also form a very slightly soluble salt of dipicolinic acid could be substituted for the sodium hydroxide.

EXAMPLE 7

48.5 parts by weight of boiled linseed oil and 1.5 parts of octadecanol were combined at 140° F. In another vessel were mixed 0.008 part dipicolinic acid, 0.80 part of 2-amino-2-methyl-1-propanol, and 49.2 parts of water. Mixing of the two solutions gave an emulsion that has been stable for over 6 months despite the deliberate imposition of 5 freeze-thaw cycles.

Using proportions ranging from 0.5 percent to 5.0 percent of fatty alcohol based on the content of boiled linseed oil, I have found that the excellent storage stabilities of my novel concentrates as well as the ease of extensibility and emulsification with water depend mainly on the selection of the fatty alcohol constituent. As determined by resistance to freeze-thaw cycles, the fatty alcohol should contain at least 12 carbons, the said stabilities increasing with increases in the length of the carbon chain. Probably as the result of steric effects arising from their high cis content, the corresponding unsaturated fatty alcohols such as oleyl alcohol and linseed alcohol do not provide easily emulsifiable concentrates nor sufficiently stable oil-in-water emulsions thereof, the emulsions breaking after only one freeze-thaw cycle. The preferred proportion of fatty alcohol (based on the linseed oil) is 3 percent, which proportion is high enough to provide adequate stabilities without increasing the viscosity to an impracticable level. Oil-in-water emulsions of a concentrate containing 3 percent of lauryl alcohol (based on the linseed oil) broke after only one freeze-thaw cycle. Upon substituting octadecanol or the almost as effective but less expensive commercial tallow alcohols, the emulsions were stable to five freeze-thaw cycles.

When my novel dual purpose oil-in-water emulsions are employed on freshly poured concrete or cement, i.e., initially as a curing agent, they should be applied so as to provide a non-aqueous residue of 0.20 lb. per square yard. When my emulsions are employed only for their anti-spalling action it is sufficient to provide a coverage representing 0.16 lb. of non-volatiles per square yard.

Although for the purpose of utilizing excess supplies on hand I have employed the commercially mis-named "boiled" linseed oil containing small amounts of driers, it is reasonable to expect that one could substitute either row linseed oil, refined linseed oil, or blown linseed oil therefor and add driers when forming the final emulsion.

It will be appreciated that one limiting factor on the amount of soap-forming alkali employed (which limitation applies also to the possibility of adding a pre-formed emulsifier) is that for applicant's purpose it would be undesirable to prepare permanently stable or spontaneously re-emulsifying emulsions incompletely dried films of which would tend to re-emulsify in the event of unexpected rain.

The proportions set forth in the examples are not extremely critical and an operative film-forming oil-in-water emulsions can be obtained by adding about an equal amount of water to a boiled linseed oil solution containing per 100 parts of oil approximately 3 parts of tallow alcohols, 0.008 part dipicolinic acid, and preferably, for better stability of the emulsion and greater uniformity of the resulting film, 0.8 part of 2-amino-2-methyl-1-propanol, which latter compound apparently forms a surface-active soap by reaction with the carboxyl groups of the 1.4 to 10 percent of free fatty acids present in the commercially available or in my specially ordered (high free acid) boiled linseed oil.

The additional emulsion-stabilizing effect of dipicolinic acid on a linseed oil-in-water emulsion without adversely affecting the drying function of the metallic driers is disclosed in my copending application, S.N. 69,239, filed November 14, 1960, now Patent No. 3,140,191.

Although evaluations of the above compositions, either as dual agents for curing and then preventing spalling of freshly prepared concrete or only as anti-spalling agents for cured concrete, are still in progress, my directly prepared emulsions and those prepared by the addition of water to the stored non-aqueous solutions appear to be effective, low in cost and in man-hour requirements, and are certainly free of toxicity and fire hazards so that they can be used without risk by "do-it-yourself" inclined people.

Having fully disclosed my invention, I claim:

A water-extendable non-aqueous solution consisting of about 95 parts by weight of a linseed oil, about 2.5 parts of tallow alcohol, about 1.5 parts by weight of a soap-solubilizing mixture consisting of about 2 parts of 4-methoxy-4-methyl-pentanol-2 and 1 part ethylene glycol, about 0.8 part of a base selected from the group consisting of sodium hydroxide, potassium hydroxide, and ammonium hydroxide, and not more than about 0.035 part by weight of dipicolinic acid.

References Cited by the Examiner
UNITED STATES PATENTS

| | | | |
|---|---|---|---|
| 2,143,515 | 1/1939 | Hayden. | |
| 2,344,671 | 3/1944 | Bertsch | 252—351 |
| 2,391,041 | 12/1945 | Atamberger | 252—312 |
| 2,587,267 | 2/1952 | Wray et al. | 106—243 |
| 2,961,331 | 11/1960 | Wheeler | 106—264 |
| 3,140,191 | 7/1964 | Kubie | 106—263 |

ALEXANDER H. BRODMERKEL, *Primary Examiner.*

L. B. HAYES, *Assistant Examiner.*